Inventor
DAVID SCARTH RITCHIE

Inventor
DAVID SCARTH RITCHIE

# United States Patent Office 3,558,212
Patented Jan. 26, 1971

3,558,212
GYROSCOPICALLY STABILIZED OPTICAL SYSTEMS
David Scarth Ritchie, Glasgow, Scotland, assignor to Barr & Stroud Limited
Filed Jan. 28, 1969, Ser. No. 794,525
Claims priority, application Great Britain, Mar. 3, 1968, 11,932/68
Int. Cl. G02b 23/00
U.S. Cl. 350—16      6 Claims

ABSTRACT OF THE DISCLOSURE

An optical system providing a line of sight stabilized relative to a sighting graticule for cross-roll and pitch movements of a vehicle mounting the system. The light path through the system including two gyro-stabilized reflecting surfaces, one stabilized about each of the axes of movement.

---

This invention relates to an optical system having a line of sight stabilized for cross-roll and pitch movement of a vehicle.

The present invention is an optical system having a line of sight stabilized relative to a sighting graticule for cross-roll and pitch movements of a vehicle mounting the system, the system including a first reflecting component, a telescope having ×2 magnification and disposed to receive light from the reflecting component, a first reflector disposed to receive light from the telescope and gyro-stabilized about a first or pitch axis, a second reflector disposed to receive light from the first reflector and gyro-stabilized about a second or roll axis at right angles to the first axis, and an observer eyepiece system disposed to receive light from the second reflector.

Means may be provided to elevate the reflecting component and the second reflector may be mounted on a carriage movable towards and away from the first reflector under the control of a servo-motor operable as a function of the elevation of the objective component.

Preferably the system, apart from the observer eyepiece system, is rotatable in azimuth, the observer eyepiece system including a vertically disposed dove prism rotatable about its vertical axis at half the rate of rotation of the rotatable system.

Light from the second reflector and from an illuminated graticule may be combined in a beam splitting prism.

Figure 1:
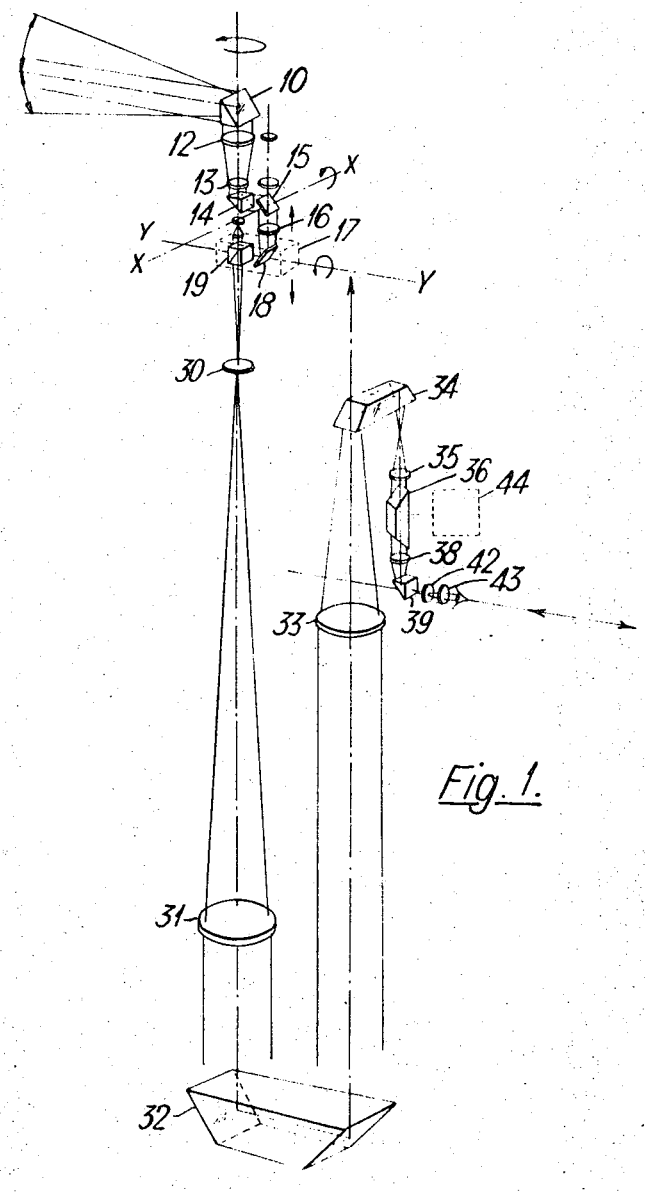
Figure 2:
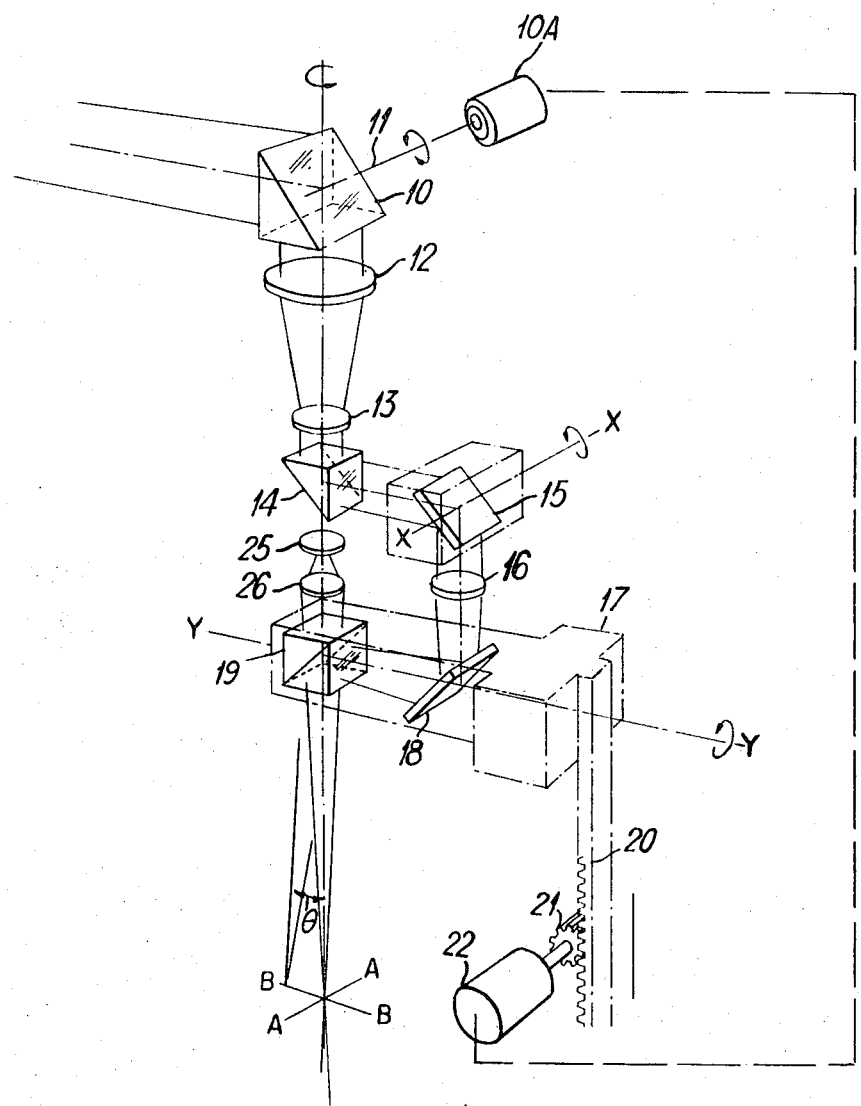

An embodiment of the present invention will now be described, by way of example, with reference to the accompanying drawings, in which:

FIG. 1 diagrammatically illustrates an optical system having a line of sight gyro-stabilized for cross-roll and pitch movements of a vehicle in which the system is mounted; and FIG. 2 illustrates details of FIG. 1.

Referring now to the drawings, in particular FIG. 2, the system includes a first reflecting component, in this embodiment a prism 10 which may be elevated by elevating means or scan means, indicated at 10A, about a transverse axis 11. Disposed beneath the prism 10 is a ×2 magnifying Galilean telescope comprising lenses 12 and 13. The telescope provides a collimated output which is reflected by a prism 14 and a reflector, in this embodiment a mirror 15, and passes through a lens 16. Associated with the mirror 15 is a gyro unit (not shown) which stabilizes the mirror 15 in space about the transverse pitch axis. Disposed beneath the lens 16 is a carriage 17 supporting a second reflector, in this embodiment a mirror 18 and a beam splitting prism 19. The mirror 18 is stabilized against cross-roll about the vehicle longitudinal axis by a gyro unit mounted on the carriage 17 which is moreover movable vertically by means of a rack 20 and pinion 21 driven by a servo-motor 22. The servo-motor 22 is coupled with the scan means 10A for the prism 10 and moves the carriage 17 as a function of the elevation of the prism 10.

Disposed above the prism 19 is an illuminated graticule 25 and a lens 26, the prism 19 combining the graticule image with the image from the mirror 18. The combined image then passes through field lenses 30 and 31 (FIG. 1) to an observer eyepiece system shown in FIG. 1. All the components between the prism 10 and the lens 31 are rotatable in azimuth.

The observer eyepiece system consists of a prism 32, lens 33, prism 34, lens 35, dove prism 36, lens 38, prism 39 and eyepiece lenses 42 and 43. The dove prism 36 is rotatable and the drive 44 therefore is arranged to rotate the prism about its vertical axis at the rate half that of the components 10 to 31.

In use the observer trains the prism 10 onto an object to be viewed, adjusting as necessary the elevation of the prism 10. The rotatable dove prism compensates for any azimuth movement of the periscope. The observer then sees the object with the graticule superimposed, and may "track" the object by adjusting the azimuth bearing of the periscope and the elevation of the prism 10. However, as the vehicle in which the observer is seated moves over rough terrain, the vehicle pitches and rolls. The pitching movement takes place about the axis X—X shown in FIG. 2, and the rolling movement takes place about the axis Y—Y. The azimuth axis is of course perpendicular to both the X—X and Y—Y axes. The pitch error introduced by vehicle movement into the established line of sight is compensated by the gyro stabilized mirror 15 in conjunction with the magnifying telescope. Similarly, the cross-roll error is compensated by the gyro stabilized mirror 18 on the carriage 17, the vertical movement of the carriage under control of the motor 22 being necessary to compensate for the component of error due to elevation of the prism 10, i.e. when the prism 10 is elevated, cross-roll of the vehicle produces a false or apparent yaw movement visible to the observer and this error component must be compensated.

Using this system a line of sight established by the observer from the prism 10 is stabilized relative to the graticule or sighting mark fixed in the system.

I claim:
1. A stabilized line of sight optical viewing system including a support, a plurality of optical elements mounted on said support including an unstabilized, pivotally mounted first reflector arranged to receive light along a line of sight from an object being viewed and to reflect said light along a first or azimuth axis, a telescope having ×2 magnification optically aligned therewith to receive light from the first reflector, a second reflector gyro-stabilized about a second or pitch axis and optically arranged to receive collimated light from the telescope and reflect said light along an axis parallel to said azimuth axis, a movable carriage including a third reflector gyro-stabilized about a third or roll axis and optically arranged to receive convergent light to receive light from the second reflector and reflect said light along an axis parallel to said azimuth axis, elevating means for elevating said first reflector about an axis parallel to said pitch axis, an unstabilized sighting graticule, image-combination means mounted on the carriage and optically disposed to combine light from the sighting graticule and from the third reflector, an observer eyepiece system disposed to receive said combined light and permit an image of said object superimposed on an image of said graticule to be observed, and means including a servo motor operable as a function of the elevation of the first reflector for moving said carriage along a plane containing said azimuth axis towards and away from the first reflector, the azimuth, pitch, and roll axes being mutually perpendicular and the arrangement being such that said line of sight is stabilized relative to the sighting graticule for cross-roll and pitch movements of said support.

2. The system according to claim 1, wherein said image-combination means includes a beam-splitting prism, and said graticule is illuminated.

3. The system according to claim 1, wherein the observer eyepiece system includes a dove prism the axis of which is parallel to said azimuth axis, the system apart from the observer eyepiece system, being rotatable in azimuth, and said dove prism being contra-rotatable about its axis at half the rate of rotation of the rotatable system.

4. The system according to claim 2, wherein the observer eyepiece system includes a dove prism the axis of which is parallel to said aximuth axis, the system apart from the observer eyepiece system, being rotatable in aximuth, and said dove prism being contra-rotatable about its axis at half the rate of rotation of the rotatable system.

5. The system according to claim 1, wherein the observer eyepiece system includes a half-speed prism the axis of which is parallel to said aximuth axis, the system apart from the observer eyepiece system being rotatable in azimuth, and said half-speed prism being contra-rotatable about its axis at half the rate of rotation of the rotatable system.

6. The system according to claim 2, wherein the observer eyepiece system includes a half-speed prism the axis of which is parallel to said azimuth axis, the system apart from the observer eyepiece system being rotatable in azimuth, and said half-speed prism being contra-rotatable about its axis at half the rate of rotation of the rotatable system.

References Cited

UNITED STATES PATENTS

| | | | |
|---|---|---|---|
| 1,744,994 | 1/1940 | Von Hofe et al. | 350—10 |
| 2,505,819 | 5/1950 | Wrigley | 350—10X |
| 3,005,185 | 10/1961 | Cumming et al. | 356—252X |
| 3,326,619 | 6/1967 | Johnson et al. | 350—16 |
| 1,863,558 | 6/1932 | Holder | 350—16X |

PAUL R. GILLIAM, Primary Examiner